US007350288B2

(12) United States Patent
Sanders et al.

(10) Patent No.: US 7,350,288 B2

(45) Date of Patent: Apr. 1, 2008

(54) CARD STIFFENER AND INSERTION TOOL

(75) Inventors: James W. Sanders, Leander, TX (US); Austin O. Roche, IV, Austin, TX (US)

(73) Assignee: Infineon Technologies AG, Munich (DE)

( * ) Notice: Subject to any disclaimer, the term of this patent is extended or adjusted under 35 U.S.C. 154(b) by 195 days.

(21) Appl. No.: 11/198,129

(22) Filed: Aug. 5, 2005

(65) Prior Publication Data

US 2007/0032114 A1 Feb. 8, 2007

(51) Int. Cl.
*B23P 19/00* (2006.01)

(52) U.S. Cl. ......................... 29/739; 729/740; 729/758

(58) Field of Classification Search .................. 29/825, 29/832, 842, 729, 739, 740, 758

See application file for complete search history.

(56) References Cited

U.S. PATENT DOCUMENTS 4,416,496 A * 11/1983 Brefka ........................ 439/59
4,980,856 A * 12/1990 Ueno ......................... 361/684
5,216,578 A * 6/1993 Zenitani et al. ............. 361/690
5,326,277 A * 7/1994 Kuramitsu .................. 439/327
5,853,297 A * 12/1998 Moulton et al. ............ 439/327
6,077,093 A * 6/2000 Seong et al. .................. 439/79
6,351,374 B1 * 2/2002 Sherry ........................ 361/685
6,453,532 B1 * 9/2002 Maiers et al. .............. 29/281.5
6,493,235 B1 * 12/2002 Barringer et al. ........... 361/756
6,884,117 B2 4/2005 Korsunsky et al.
6,893,271 B2 * 5/2005 Seith et al. ................... 439/79

* cited by examiner

*Primary Examiner*—Carl J. Arbes
(74) *Attorney, Agent, or Firm*—Eschweiler & Associates, LLC

(57) ABSTRACT

A removable insertion tool is provided for inserting a circuit board into a socket, wherein the insertion tool generally provides an increased surface area for handling the circuit board and further generally prevents a flexure of the circuit board during insertion. The insertion tool has a generally elongate stiffening member and laterally extending engagement member disposed at each opposing end thereof. The engagement members are operable to receive the circuit board, wherein the insertion tool generally provides a removable truss for the circuit board during handling or insertion into a socket. One or more of the engagement members and stiffening member may comprise a groove defined therein, wherein the groove further provides for selective engagement of the circuit board.

8 Claims, 3 Drawing Sheets

CARD STIFFENER AND INSERTION TOOL

FIELD OF INVENTION

The present invention relates generally to devices, systems, and methods for inserting a card into a socket, and more particularly to devices, systems, and methods for inserting a memory card into a memory slot.

BACKGROUND OF THE INVENTION

Inserting thin cards into slots or sockets is common in many industries. In the electronics industry, for example, a removable circuit board is commonly electrically connected to various other electronic components, such as a computer motherboard, through a socket mounted on the motherboard. One common type of circuit board is a memory module, such as a Double Date Rate—Dual In-line Memory Module, or DDR DIMM, wherein one or more integrated circuits (ICs) are mounted on a thin, insulative card (e.g, having a thickness on the order of 2 mm), wherein the ICs are electrically connected to a plurality of contacts situated along a contact portion of the card. The plurality of contacts of the memory module may be electrically connected to the motherboard via an insertion of the memory module into a DIMM socket associated with the motherboard. In a conventional application, the memory module comprises a notch in the insulative card, wherein a locking mechanism associated with the motherboard is operable to engage the notch and generally lock the memory module into the DIMM socket upon a full insertion of the memory module into the socket. Such a locking of the memory module into the DIMM socket typically assures a reliable electrical contact between the DIMM socket and the plurality of contacts associated with the memory module.

Typically, a substantially large insertion force is necessary to press a memory module into the DIMM socket, thus generally assuring that the memory module is properly seated in the socket, and/or that the locking mechanism engages the notch in the card. In order to avoid damage to and/or contact with various ICs mounted on sides of the memory module, the insertion force is typically applied along an edge of the card that is generally opposite the contact portion of the card. Depending on various factors, the insertion force can be quite substantial, wherein the insertion force may lead to a bending or flexure of the thin insulative card during insertion. Flexure of the card can be deleterious to various electrical interconnections associated with the memory module, such as ball grid array (BGA) bonds between the ICs and the card. The flexure caused by the insertion force, for example, can lead to breakage or weakening of the bonds between the ICs and the card, thus leading to potential failure of the card and/or other components connected thereto.

Furthermore, since the thickness of the card is quite thin, the insertion force can lead to physical pain and/or fatigue for a person handling and inserting the memory module into a socket. Such pain and/or fatigue can be greatly increased for an assembly person assembling motherboards on a production line, wherein the assembly person may insert hundreds of memory modules into motherboards throughout their work shift.

Accordingly, there is a need for an insertion device for handling and inserting circuit boards, such as memory modules, into sockets, wherein damage to the circuit boards and/or physical pain to a handler of the circuit board is substantially reduced.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention involves an insertion of a card, such as an electronic circuit board or memory module, into a slot or socket, wherein an insertion tool generally prevents deleterious bending or flexing of the circuit board during insertion. In accordance with one exemplary embodiment of the invention, the insertion tool generally defines a removable truss, wherein the truss generally prevents the circuit board from flexing during insertion, and wherein the truss can be easily attached to, and detached from, the circuit board, therein providing a simple and economical means for installing circuit boards while minimizing damage to the circuit boards.

The insertion tool of the present invention, for example, comprises a robust stiffener coupled to a pair of engagement arms, wherein the engagement arms are operable to slidingly engage the circuit board, while the stiffener generally provides a rigid support for the circuit board. The stiffener further substantially increases a surface area to which an insertion force may be applied, therein ameliorating stress and strain injuries to an assembler's fingers and/or thumbs. The engagement arms, in one example, comprise grooves operable to engage and retain the circuit board through a frictional fit between the engagement arms and edges of the circuit board.

A system and method for inserting circuit boards is further provided, wherein an insertion tool is used to insert a circuit board into a socket while minimizing a flexing of the circuit board. The insertion tool, for example, can be used as part of an automated assembler, wherein circuit boards are placed in the insertion tool, and the assembler automatically applies the insertion force to insert the circuit board into a socket. The insertion tool may also be removed from the circuit board once insertion is complete, in order to use the same insertion tool for inserting another circuit board, either manually, or by other automation.

The following description and annexed drawings set forth in detail certain illustrative aspects and implementations of the invention. These are indicative of only a few of the various ways in which the principles of the invention may be employed. Other objects, advantages, and novel features of the invention will become apparent from the following detailed description of the invention when considered in conjunction with the drawings.

DETAILED DESCRIPTION OF THE INVENTION

Figure 1:
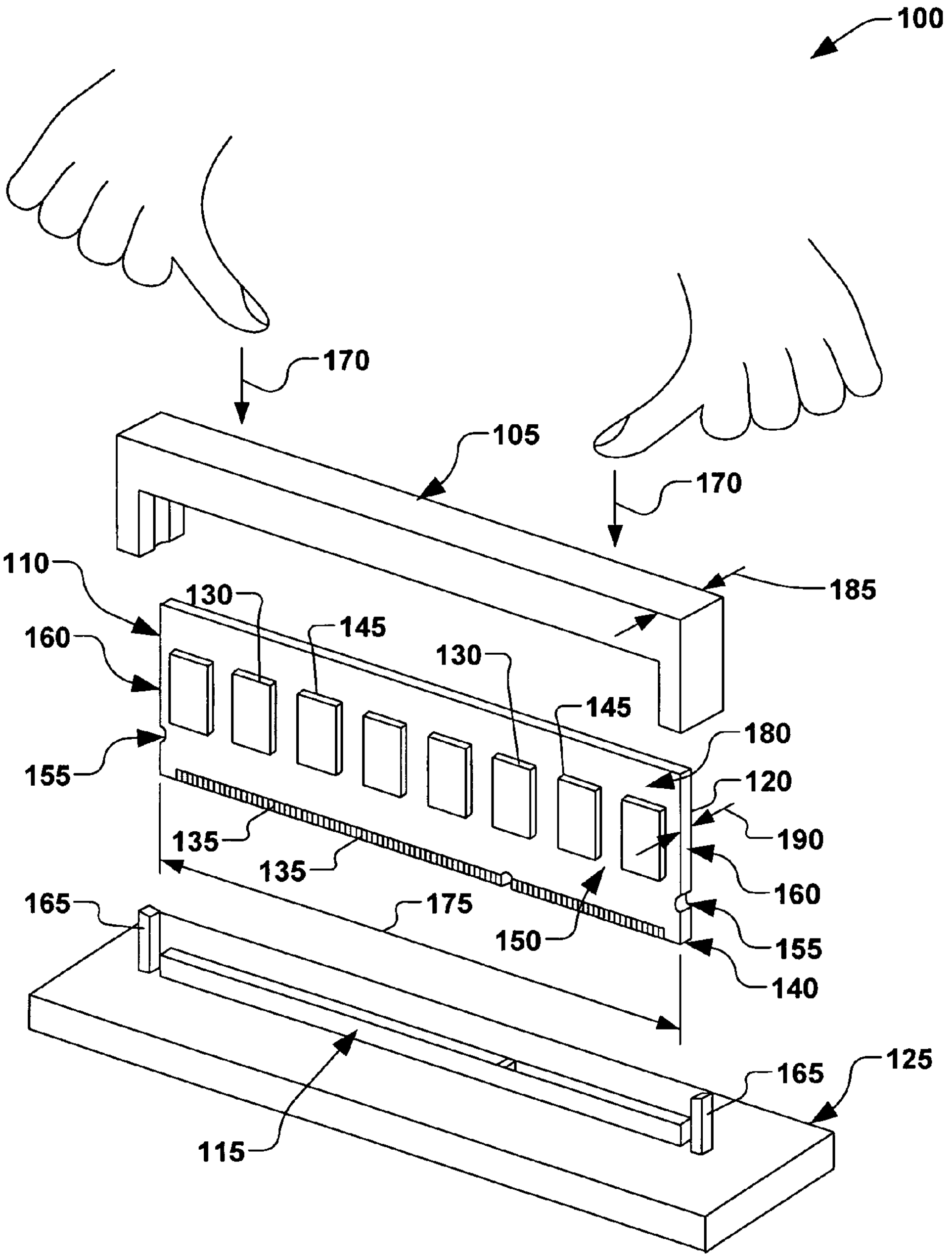
FIG. 1 is an exploded perspective view of an exemplary insertion system for inserting a circuit board into a socket, in accordance with one embodiment of the present invention.

Accordingly, one or more implementations of the present invention will now be described with reference to the attached drawings, wherein like reference numerals are used to refer to like elements throughout. It should be understood that the description of these aspects are illustrative and that they should not be taken in a limiting sense. In the following description, for purposes of explanation, numerous specific details are set forth, by way of example, in order to provide a more thorough understanding of the present invention. It will be evident to one skilled in the art, however, that the present invention may be practiced without these specific details.

Referring initially to FIG. 1, an exploded perspective view of an exemplary insertion system 100 is illustrated, wherein several inventive aspects of the present invention will now be discussed. The insertion system 100 comprises an insertion tool 105, a circuit board 110, and a socket 115, wherein the socket is operable to receive and generally retain the circuit board therein. In the present example, the circuit board 110 comprises a memory module 120 (also called a memory card), wherein the socket 115 is operable to selectively engage the memory card. The socket 115, for example, further resides on, or is associated with, a motherboard 125, such as a motherboard associated with a personal computer (not shown). It should be understood, however, that the circuit board 110 of the present invention may comprise any type of thin card or module, whether used in conjunction with other electronic circuitry or not, and that all such alternatives are contemplated as falling within the scope of the present invention.

In accordance with one exemplary aspect of the present invention, the memory module 120 comprises one or more integrated circuits (ICs) 130 electrically coupled thereto. The one or more ICs 130, for example, may comprise memory circuits, buffers, or any other electronic circuitry (not shown), wherein the one or more ICs are electrically coupled to a plurality of contacts 135 associated with a portion 140 of the memory module 120. In the present example, the memory module 120 comprises a Double Date Rate—Dual In-line Memory Module, or DDR DIMM (e.g., a DDR-2 DIMM), wherein one or more of the ICs 130 comprise a ball grid array (BGA) package 145 that is generally bonded to a surface 150 of the memory module via a plurality of solder ball connections (not shown).

The memory module 120 of FIG. 1 is operable to be selectively engaged and disengaged from the socket 115. In the present example, the plurality of contacts 135 are operable to be inserted into the socket 115, therein electrically connecting the memory module to the motherboard 125 via the socket 115. In another example, the circuit board 110 further comprises one or more notches 155 defined along one or more respective edges 160 thereof, wherein the one or more notches are associated with one or more respective spring clamps or pivoting lever clamps 165 associated with the socket 115. The one or more spring clamps or pivoting lever clamps 165 are operable to selectively engage the one or more notches 155 upon a full insertion of the plurality of contacts 135 into the socket 115, therein substantially locking the circuit board 110 to the socket.

In order to facilitate an insertion of the circuit board 110 (e.g., the memory module 120) into the socket 115, an insertion force 170 is applied along a length 175 of the circuit board, wherein the plurality of contacts 135 are generally pushed or pressed into the socket 115. Upon application of the insertion force 170 to the circuit board 110, however, it is generally desirable to prevent a flexure or bending of the memory module along a plane 180 defined by the surface 150 of the circuit board. In the case of the circuit board 110 comprising one or more BGA packages 145, for example, deleterious bending or flexure of the circuit board is of even greater concern, since such flexure can lead to cracking or breaking of the solder ball connections (not shown) associated with the one or more BGA packages.

Therefore, in accordance with another exemplary embodiment of the present invention, the insertion tool 105 of FIG. 1 is operable to selectively engage the circuit board 110 in order to generally provide a stiffening effect to the circuit board during the insertion of the circuit board into the socket 115. In effect, the insertion tool 105 is operable to act as a truss during handling and insertion of the circuit board 110 into the socket 115. In one example, the insertion tool 105 is comprised of an electrically insulative material (e.g., an injection-molded thermoplastic), wherein a thickness 185 of the insertion tool 105 is greater than a thickness 190 of the circuit board 110, therein providing a stiffening effect to the circuit board. Alternatively, the insertion tool 105 may be comprised of any material, operable to generally prevent the surface 150 of the circuit board 110 from flexing during handling and insertion into the socket 115. The insertion tool 105, for example, may be utilized in conjunction with an automated, semi-automated, or manual assembly system (not shown), wherein the circuit board 110 is inserted into the motherboard 125 of an electronic system prior to shipment to a customer. Alternatively, the insertion tool 105 may be used in conjunction with an automated, semi-automated, or manual circuit board test system (not shown), wherein the circuit board 110 is inserted into a test fixture (not shown) via the insertion tool for quality verification.

Figure 2A:
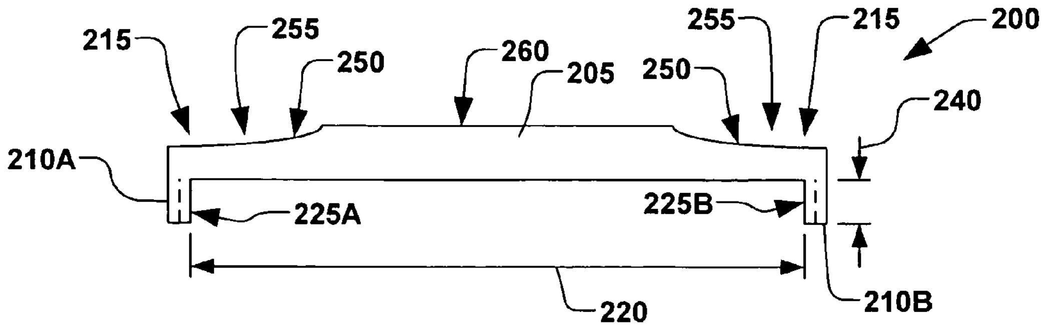
FIGS. 2A and 2B illustrate respective front and bottom views of one exemplary insertion device in accordance with the present invention.
Figure 2B:
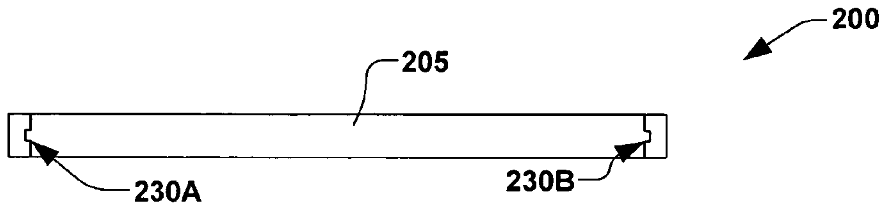

FIGS. 2A and 2B illustrate one exemplary insertion tool 200, in front and bottom views, respectively. The insertion tool 200, for example, comprises an elongate stiffening member 205, wherein an elongate engagement member 210 (e.g., a first elongate engagement member 210A and a second elongate engagement member 210B) generally extends from each end 215 of the elongate stiffening member. Each elongate engagement member 210A and 210B extends generally perpendicularly from the elongate stiffening member 205, wherein a separation distance 220 is generally defined between opposing edges 225A and 225B of the respective elongate engagement members 210A and 210B, and wherein the separation distance is associated with the length 175 of the circuit board 110 of FIG. 1. In one example, the separation distance 220 of FIG. 2A is selected in order to provide a friction fit between the edges 160 of the circuit board 110 of FIG. 1 and the respective elongate engagement member 210A and 210B.

According to another exemplary embodiment of the invention, each elongate engagement member 210A and 210B comprises a respective engagement groove 230A and 230B defined therein, as illustrated in FIG. 2B, wherein each engagement groove is associated with the thickness 190 of the circuit board 110 illustrated in FIG. 1. Each engagement groove 230A and 230B of FIG. 2B, for example, is operable to slidingly engage the circuit board 110 of FIG. 1, wherein each engagement groove generally extends along a length 240 of each respective elongate engagement member 210A and 210B. Each engagement groove 230A and 230B may be substantially U-shaped (e.g., as illustrated in FIG. 2B), V-shaped, or a combination thereof, such that each engagement groove is operable to generally engage the circuit board 110.

In one example, the separation distance 220 between the opposing edges 225A and 225B of the respective engagement members 210A and 210B varies along a length 240 of the engagement members (e.g., one or more of the engagement members 210A and 210B are slightly skewed from extending perpendicularly from the elongate stiffening member 205), therein providing a varying amount of friction against the circuit board 110 of FIG. 1. In another alternative embodiment, the elongate engagement members 210A and 210B of FIGS. 2A and 2B are generally flexible, wherein the elongate engagement members are biased toward one another (e.g., operable to act as a spring), wherein the bias is further operable to provide a frictional engagement between the elongate engagement members and the circuit board 110 of FIG. 1.

According to another example, the elongate stiffening member 205 of the insertion tool 200 of FIGS. 2A and 2B further comprises a curved portion 250 defined therein, wherein the curved portion is operable to generally provide an ergonomic pressure region 255 for the application of the insertion force F of FIG. 1 by hand, such as by the use of one or more thumbs and/or fingers to exert the insertion force F on the insertion tool. The insertion tool 200 may further comprise a handle portion 260 to assist in a removal of the insertion tool from the circuit board 110 of FIG. 1 after the circuit board is inserted into the socket 115. The handle portion 260 of FIG. 2A, for example, may be flared or otherwise shaped, such as to assist in a removal of the insertion tool 200 from the circuit board.

Alternatively, the insertion tool 200 may comprise various interconnection features (not shown), wherein the insertion tool 200 may be operably coupled to an automated machine, such as a pick-and-place robotic assembler (not shown) via the various interconnection features. In yet another alternative, the insertion tool 200 may be operably coupled to a semi-automated assembly jig (not shown), wherein one or more circuit boards 110 of FIG. 1 may be manually loaded into one or more insertion tools coupled to the assembly jig, and wherein the assembly jig further facilitates the insertion of the one or more circuit boards into respective sockets 115 in either an automated or semi-automated manner.

Figure 3A:
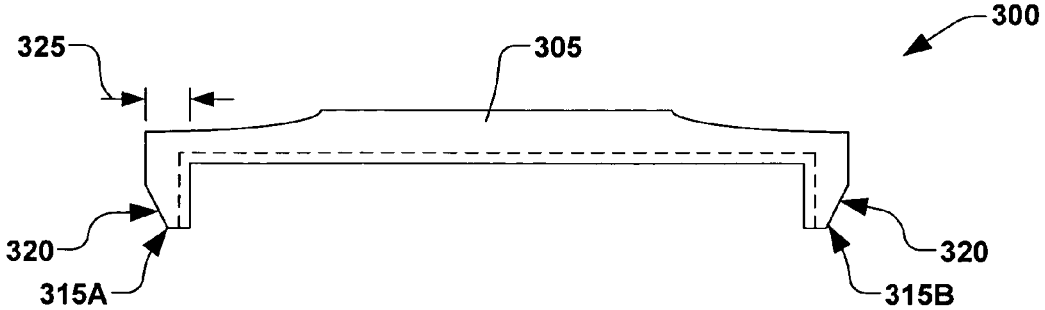
FIGS. 3A and 3B illustrate respective front and bottom views of another exemplary insertion device in accordance with another embodiment of the present invention.
Figure 3B:
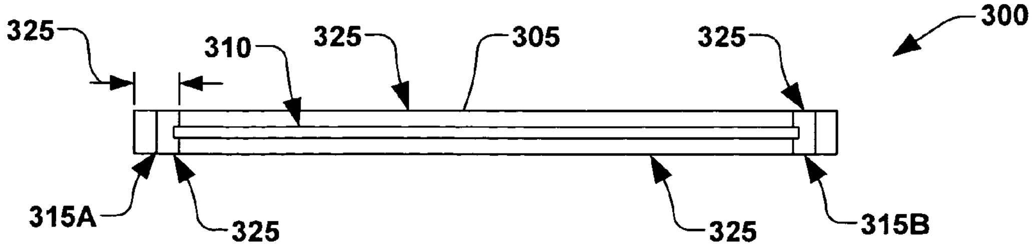

FIGS. 3A and 3B illustrate another exemplary insertion tool 300, comprising many of the features of the insertion tool 200 of FIGS. 2A and 2B. The insertion tool 300 of FIGS. 3A and 3B, however, further comprises a stiffening member 305 having a lateral groove 310 defined therein, wherein the groove is lateral groove is further operable to engage the circuit board 110 of FIG. 1, therein further generally preventing flexure of the circuit board during insertion into the socket 115. The lateral groove 310 of FIGS. 3A and 3B, for example, may also be U-shaped or V-shaped, an may further be associated with the thickness 190 of the circuit board of FIG. 1. Engagement members 315A and 315B are further provided in FIGS. 3A and 3B, wherein the engagement members are similar to the elongate engagement members 210A and 210B of FIGS. 2A and 2B. The engagement members 315A and 315B, however, further comprise one or more beveled edges 320, wherein the one or more beveled edges 320 generally provide for a greater thickness 325 of the engagement members for greater rigidity, while generally limiting potential interferences with various other devices associated with the motherboard 125 of FIG. 1. One or more lengthwise edges 325 illustrated in FIG. 3B, for example, may further comprise an alignment bevel (not shown) along the length of the insertion tool, such that the alignment bevel generally increases a versatility of the insertion tool 300. For example, when the insertion tool 300 is utilized in conjunction with an automated or semi-automated insertion system, the alignment bevel of the one or more lengthwise edges 325 generally facilitates a guidance or alignment of the circuit board 110 of FIG. 1 into the socket 115. Alternatively, the top handle portion 260 may comprise an alignment bevel (not shown) along the length thereof, such that the alignment bevel facilitates alignment between the tool and a pick and place apparatus that operates to pick up the tool (e.g., with the card therein), and place the assembly into the appropriate socket on a circuit board, for example.

Figure 4:
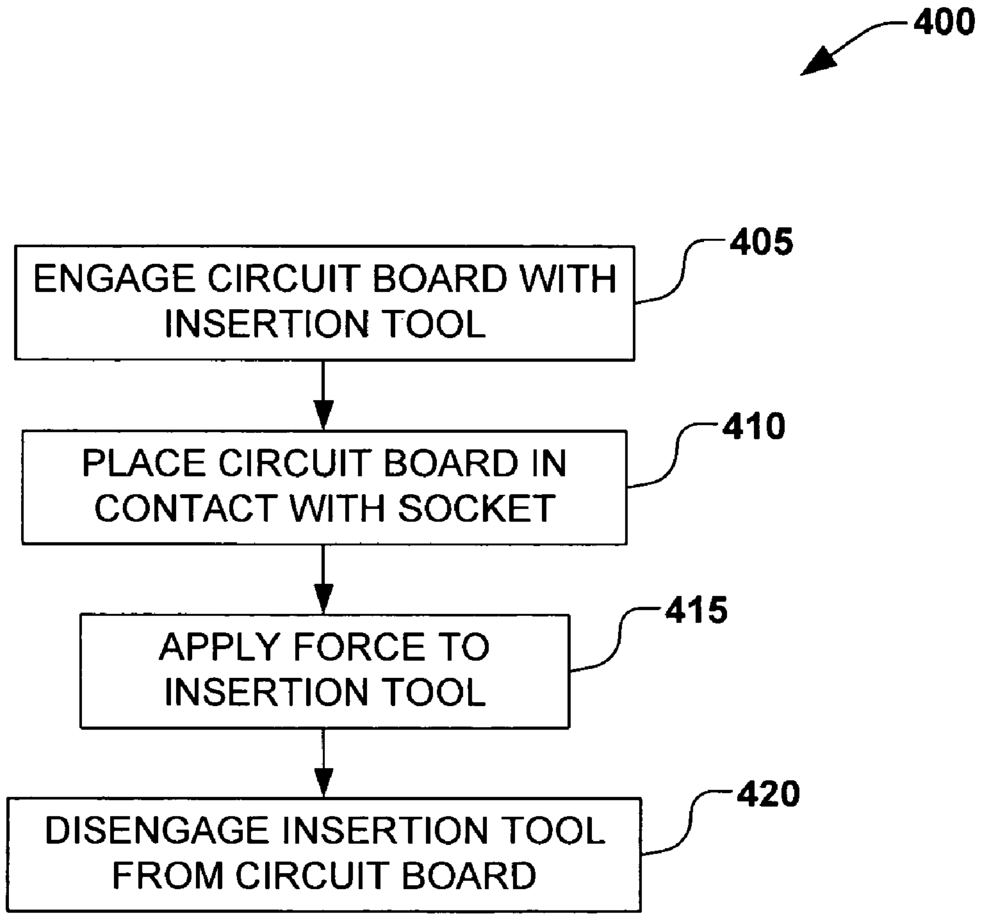
FIG. 4 is a block diagram of an exemplary method for inserting a circuit board into a socket in accordance with still another embodiment of the present invention.

Referring now to FIG. 4, an exemplary method 400 for inserting a circuit board into a socket is illustrated, wherein bending or flexure of the circuit board is substantially prevented by the use of an insertion tool. While exemplary methods are illustrated and described herein as a series of acts or events, it will be appreciated that the present invention is not limited by the illustrated ordering of such acts or events, as some steps may occur in different orders and/or concurrently with other steps apart from that shown and described herein, in accordance with the invention. In addition, not all illustrated steps may be required to implement a methodology in accordance with the present invention. Moreover, it will be appreciated that the methods may be implemented in association with the systems illustrated and described herein as well as in association with other systems not illustrated.

As illustrated in FIG. 4, the method 400 begins with engaging a circuit board with an insertion tool in act 405, such as engaging the circuit board 110 illustrated in FIG. 1 with the insertion tool 105. In one example, the opposing edges 225A and 225B of the insertion tool 200 of FIGS. 2A and 2B are slid along respective opposing edges 160 of the circuit board 110 of FIG. 1 until the stiffening member 205 of the insertion tool 200 contacts the circuit board. In act 410 of FIG. 4, a plurality of contacts associated with the circuit board are placed in contact with a socket. For example, the circuit board 110 of FIG. 1 is placed proximate to the socket 115 manually, by semi-automation, or by automation, wherein the plurality of contacts 135 are placed in contact with the socket 115. In act 415 of FIG. 4, a force is applied to the insertion tool, such as by a thumb or finger, wherein the force generally presses the plurality of contacts into the socket, and wherein the insertion tool generally prevents a bending of the circuit board during the application of the force. For example, the stiffening member 205 of FIGS. 2A and 2B, in conjunction with the engagement members 210A and 210B, generally prevent a flexure of the circuit board 110 of FIG. 1 during the application of force 170 thereto. Once the circuit board is inserted into the socket, the insertion tool can be disengaged or removed from the circuit board in act 420 of FIG. 4, or alternatively, the insertion tool can remain coupled to the circuit board for future use.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a “means”) used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms “including”, “includes”, “having”, “has”, “with”, or variants thereof are used in either the detailed description and the claims, such terms are intended to be inclusive in a manner similar to the term “comprising”.

What is claimed is:

1. An insertion tool for inserting a circuit board into a socket, the insertion tool comprising:

a generally rigid elongate stiffening member having oppositely disposed ends thereof; and an elongate engagement member extending generally perpendicularly from each respective end of the elongate stiffening member, wherein each elongate engagement member comprises an engagement groove defined therein along a length thereof, wherein each engagement groove is associated with a thickness of the circuit board, and wherein a separation distance is defined between opposing edges of the elongate engagement members, wherein the separation distance is associated with a length of the circuit board, and wherein each elongate engagement member is operable to selectively engage a respective end of the circuit board, therein generally preventing a flexure of the circuit board.

2. The insertion tool of claim 1, wherein the separation distance generally provides a friction fit between the circuit board and the respective elongate engagement member.

3. The insertion tool of claim 1, wherein a thickness of the elongate stiffening member is substantially greater than a thickness of the circuit board.

4. The insertion tool of claim 1, wherein each elongate engagement member is biased toward a center of the elongate stiffening member.

5. An insertion tool for inserting a circuit board, the insertion tool comprising;

a stiffening member having a first engagement member and a second engagement member respectively coupled thereto at distal ends of the stiffening member, wherein the first engagement member and second engagement member are operable to selectively engage the circuit board therebetween via an engagement groove defined in each of the first engagement member and second engagement member, and wherein the elongate stiffening member is substantially rigid, therein generally preventing a flexure of the circuit board.

6. The insertion tool of claim 5, wherein the stiffening member comprises a lateral groove defined therein, wherein the lateral groove is operable to engage the circuit board, therein further generally preventing flexure of the circuit board.

7. The insertion tool of claim 5, wherein each engagement groove is associated with a thickness of the circuit board, and wherein each engagement groove is operable to slidingly engage the circuit board.

8. The insertion tool of claim 5, wherein a distance between the first engagement member and second engagement member associated with a length of the circuit board.

* * * * *